2 Sheets--Sheet 1.

E. R. MORRISON.
Improvement in Machines for Felling Trees.

No. 115,975. Patented June 13, 1871.

Witnesses.
C. H. Poole
Edw. F. Brown

Inventor.
E. R. Morrison

E. R. MORRISON.

Improvement in Machines for Felling Trees.

No. 115,975.

2 Sheets--Sheet 2.

Patented June 13, 1871.

Witnesses.
C. H. Poole
Edw. F. Brown.

Inventor.
E. R. Morrison 115,975

UNITED STATES PATENT OFFICE.

ENOCH R. MORRISON, OF NEW YORK, N. Y.

IMPROVEMENT IN MACHINES FOR FELLING TREES.

Specification forming part of Letters Patent No. 115,975, dated June 13, 1871.

*To all whom it may concern:*

Be it known that I, ENOCH R. MORRISON, of New York, in the county of New York and State of New York, have invented certain new and useful Improvements in a Machine or Apparatus for Felling Trees, Cross-Cutting Logs and Timber for various purposes and uses; and the following is a full, clear, and exact description of the same, reference being had to the accompanying drawing making a part of this specification, in which—

Figure 1:
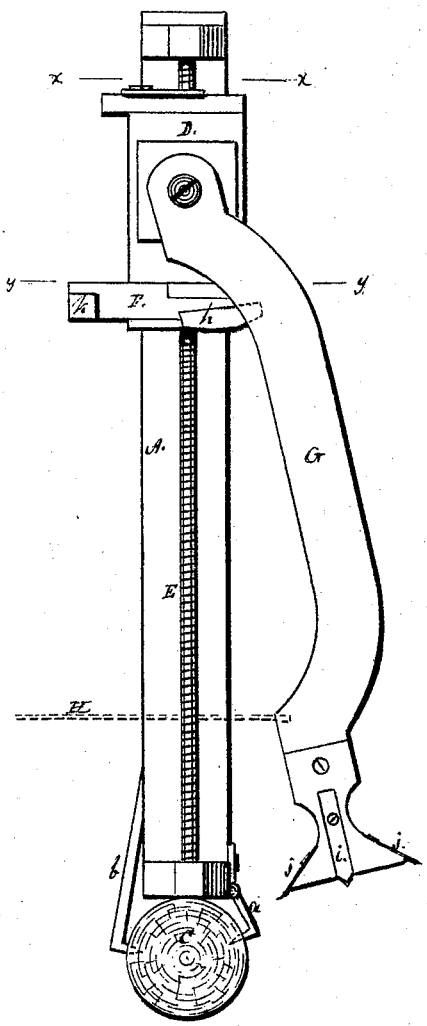
Figure 2:
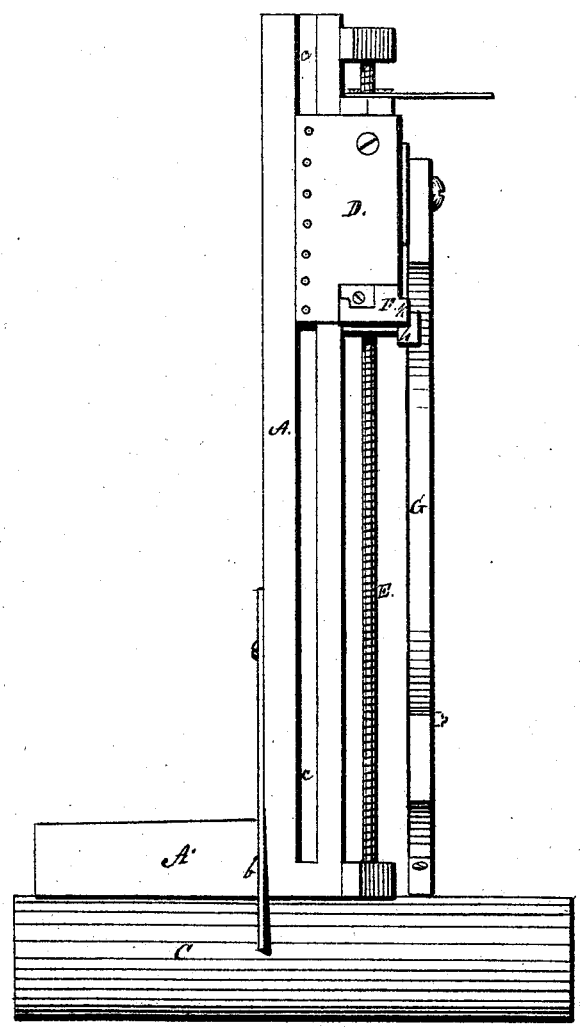
Figure 3:
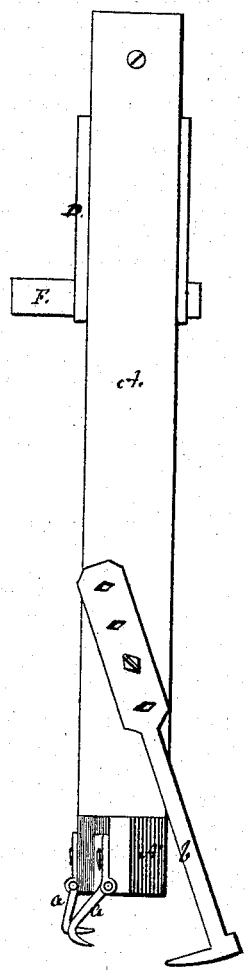
Figure 4:
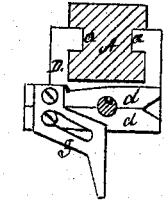
Figure 5:
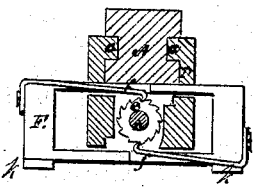
Figure 6:
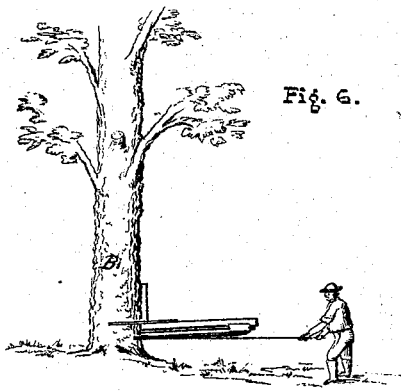

Figure 1, Plate 1, represents a vertical front view of my machine or apparatus as attached to a small log for cutting. Fig. 2 shows a side-view elevation of the same. Fig. 3, plate 2, shows a rear-side view with the hinged dogs or hooks for fastening the apparatus to a log, timber, or tree. Fig. 4 shows a cross-section of the slide at $x\,x$. Fig. 5 shows a view of the ratchet-feeding mechanism in a cross-section at $y\,y$. Fig. 6 represents a standing tree with my machine attached, showing the manner of its operation for cutting off and felling a tree.

The object of my invention is to facilitate the felling of timber, and save time and hard manual labor in cutting up logs for making lumber, and for cutting the larger trees and limbs to suitable lengths for cord-wood and for various purposes; and my invention consists in the construction, arrangement, and combination of a vibrating or a swinging lever, to which the cutters are attached, and a sliding head, (through which a feeding-screw passes,) and a ratchet nut and two pawls, and an open lock-nut and clamping-lever to operate the feeding mechanism in one direction, with a suitable frame-work and hinged dogs or hooks for securing the apparatus to the tree or timber.

To enable others to make and use my invention, I will describe it more in detail, referring to the drawing and the letters marked therein.

The frame A may be made of hard wood, or of metal, of any desired form, and of any suitable size and length. A portion of it is bent or framed so as to form a right angle, A', on which to secure the clamping-dogs $a\,a$ and long-arm spike-hook $b$ for fastening the apparatus to the body of the tree B or log C, as seen in Figs. 1, 2, and 6. The long portion of the frame A is provided with longitudinal grooves $c\,c$, in which the movable head D slides, and is held firmly to the frame A. Extending the whole length of the bar A, on its face side, is a feed-screw, E, in one side of which is a groove or a flat surface for a feather to work in, to hold the ratchet-wheel $e$ from turning on the screw E as it is rotated by the action of the spring-hook pawls $f\,f$ as the sliding frame F is moved laterally to operate the feed. On the top or outer end of the movable head D is secured the clasp-screw nut or box $d\,d$, which is operated and held onto the screw E by the slotted cam-lever $g$. To the face of the movable head D is pivoted the swinging or vibrating arm or lever G, which is curved to one side for the purpose of allowing a sufficient space to insert a wedge into the kerf cut after the log is one-half or more cut off, to prevent it pinching or closing onto the arm G, the end of which forms the stock for attaching to and adjusting the cutting-bits $i\,i$ and $j\,j$, two of them being lancet-points for cutting off or into the wood, and the other being plow-bits for taking out the chip alternately right and left. The plow-bits $j\,j$ may be jointed so that they will be relieved from bearing on the wood in their backward motion, if desired. A short segment of a saw, with the scribing and chipping edges formed so as to cut in a similar manner, may be secured to the vibrating arm G, and used in the place of the bits $i\,i$ and $j\,j$ as a modification of the cutters, as above described. Near the upper end of the curved arm G is a projecting segment, $h$, which comes in contact with the projections $k\,k$ on both ends of the lateral sliding frame F, by which means the ratchet-pinion $e$ is rotated to operate the screw E to feed the cutting-tools into the log at each motion of the vibrating arm, the segment $h$ being so arranged in relation to the projections $k\,k$ on the slide that the feed movement will be uniform, although the arm G may be vibrated further than is necessary to pass the cutters through the log, so that any one unskilled cannot overfeed or fail to operate it; and another advantage is that, in cutting very hard wood, by giving the arm G a large vibration or a long stroke the momentum gained will enable it to pass easily through the timber.

To operate, the machine is secured to the timber by the hook-dogs $a\ a$ and $b$, the cutters are brought to touch the highest point of the log, and by simply taking hold of the rod H and vibrating the arm G a tree may be cut off and felled, or a log cut off square and smooth.

What I claim as my invention, and desire to secure by Letters Patent, is—

1. The combination of the movable head D the feeding mechanism and the swinging arm G, which is provided with a segment, $h$, operating against the projections $k\ k$ on the lateral sliding frame F to feed the cutting uniformly, as described.

2. The combination of the hinged dogs $a\ a$ and the adjustable long-arm spike-dog $b$ with frame A, for securing the whole apparatus to a tree or log for cutting off, substantially as and for the purposes specified.

E. R. MORRISON.

Witnesses:
 EDM. F. BROWN,
 J. B. WOODRUFF.